United States Patent
Momiyama et al.

(10) Patent No.: US 10,077,826 B2
(45) Date of Patent: Sep. 18, 2018

(54) MANUFACTURING METHOD FOR FLUID COUPLING AND FLUID COUPLING

(71) Applicants: AISIN AW CO. LTD., Anjo-shi, Aichi-ken (JP); AISIN AW INDUSTRIES CO., LTD., Echizen-shi, Fukui (JP)

(72) Inventors: Naohisa Momiyama, Aichi (JP); Masayoshi Kato, Aichi (JP); Hiroshi Asane, Aichi (JP); Hitoshi Matsuura, Fukui (JP); Masaaki Yamaguchi, Fukui (JP); Kiyoshi Makihira, Fukui (JP); Takakazu Yamane, Fukui (JP); Yukihiro Yoshida, Fukui (JP); Shinya Kobayashi, Fukui (JP); Taiki Watanabe, Fukui (JP); Norio Nagahira, Fukui (JP); Kazuyoshi Miyamoto, Fukui (JP)

(73) Assignees: AISIN AW CO. LTD., Anjo-shi, Aichi-ken (JP); AISIN AW INDUSTRIES CO., LTD., Echizen-shin, Fukui (JP)

(*) Notice: Subject to any disclaimer, the term of this patent is extended or adjusted under 35 U.S.C. 154(b) by 331 days.

(21) Appl. No.: 15/037,562

(22) PCT Filed: Nov. 26, 2014

(86) PCT No.: PCT/JP2014/081188
§ 371 (c)(1),
(2) Date: May 18, 2016

(87) PCT Pub. No.: WO2015/080133
PCT Pub. Date: Jun. 4, 2015

(65) Prior Publication Data
US 2016/0290461 A1  Oct. 6, 2016

(30) Foreign Application Priority Data
Nov. 29, 2013  (JP) .................. 2013-248583

(51) Int. Cl.
*F16H 41/28* (2006.01)
*B23K 26/28* (2014.01)
(Continued)

(52) U.S. Cl.
CPC ............. *F16H 41/28* (2013.01); *B23K 26/28* (2013.01); *B23K 26/60* (2015.10); *B23K 33/006* (2013.01);
(Continued)

(58) Field of Classification Search
CPC ...... B23K 26/60; B23K 26/28; B23K 33/006; F16H 41/28
(Continued)

(56) References Cited

U.S. PATENT DOCUMENTS 4,833,295 A     5/1989  Locker et al.
5,384,958 A *   1/1995  O'Daniel ............... B21D 53/80
                                                      29/557
(Continued)

FOREIGN PATENT DOCUMENTS

DE     19755168 A1   6/1999
JP     63-51958 U    4/1988
(Continued)

OTHER PUBLICATIONS

Communication dated May 4, 2017, issued from the Europe Patent Office in counterpart European Patent Application No. 14866768.6.
(Continued)

*Primary Examiner* — F. Daniel Lopez
*Assistant Examiner* — Daniel Collins
(74) *Attorney, Agent, or Firm* — Sughrue Mion, PLLC (57) ABSTRACT

Respective outer peripheral surfaces (33, 35) of opening-side end portions (30, 31) of a front cover (12) and a pump shell (7), which have been shaped by pressing, are formed by slimming such that the outside diameters of the slimmed
(Continued)

outer peripheral surfaces are equal to each other. With the opening-side end portions abutting against each other, a high-energy beam such as a laser beam (R) is radiated toward the abutment surfaces (30, 31) from the radially outer side to weld the abutment surfaces to each other. Consequently, it is possible to perform welding accurately through easy processing in order to easily manufacture a fluid coupling with high precision that facilitates post-processing.

20 Claims, 5 Drawing Sheets (51) Int. Cl.
    *B23K 33/00* (2006.01)
    *B23K 26/60* (2014.01)
    *F16H 45/02* (2006.01)
    *F16B 5/08* (2006.01)
    *F16H 41/24* (2006.01)

(52) U.S. Cl.
    CPC ............... *F16H 45/02* (2013.01); *F16B 5/08* (2013.01); *F16H 2041/243* (2013.01); *F16H 2045/0205* (2013.01); *F16H 2045/0221* (2013.01); *F16H 2045/0226* (2013.01); *F16H 2045/0294* (2013.01)

(58) Field of Classification Search
    USPC .............................................. 60/330
    See application file for complete search history.

(56) References Cited

U.S. PATENT DOCUMENTS

| | | | |
|---|---|---|---|
| 5,996,391 A | | 12/1999 | Mizobuchi |
| 6,024,538 A | * | 2/2000 | Tanishiki ............. B23P 15/006 29/889 |
| 2005/0103593 A1 | | 5/2005 | Tanaka et al. |

FOREIGN PATENT DOCUMENTS

| | | |
|---|---|---|
| JP | 2-15891 A | 1/1990 |
| JP | 10-274316 A | 10/1998 |
| JP | 2002-147564 A | 5/2002 |
| JP | 2006111187 A | 4/2006 |
| JP | 2011-106504 A | 6/2011 |
| JP | 2011-174588 A | 9/2011 |
| JP | 2013-018035 A | 1/2013 |

OTHER PUBLICATIONS

International Search Report of PCT/JP2014/081188 dated Mar. 3, 2015.

* cited by examiner

MANUFACTURING METHOD FOR FLUID COUPLING AND FLUID COUPLING

CROSS REFERENCE TO RELATED APPLICATIONS

This application is a National Stage of International Application No. PCT/JP2014/081188, filed Nov. 26, 2014, claiming priority based on Japanese Patent Application No. 2013-248583, filed Nov. 29, 2013, the contents of all of which are incorporated herein by reference in their entirety.

TECHNICAL FIELD

The present disclosure relates to a manufacturing method for a fluid coupling such as a torque converter, and in particular to welding between a front cover and a pump shell and a fluid coupling manufactured thereby. In the present disclosure, both a torque converter, which has a stator, and a so-called fluid coupling in the narrow sense, which does not have a stator, are defined as fluid couplings.

BACKGROUND ART

In general, a front cover and a pump shell of fluid couplings (including torque converters) are welded to each other by arc welding. Therefore, a fluid coupling housing may be warped as a result of the welded portion being significantly affected by heat in combination with generation of a residual stress in the preceding pressing step. In the arc welding, in addition, welding metal such as a welding wire is added to the base material, and the welding metal may not be uniform over the entire circumference of the housing, which makes it troublesome to adjust the dynamic balance of the fluid coupling in combination with the warp due to the effect of heat.

There has hitherto been proposed a manufacturing method for a torque converter in which a front cover and a pump shell are welded to each other using a high-energy beam such as a laser beam or an electron beam (see Patent Document 1). In this technique, the outer peripheral side of one of the front cover and the pump shell is scraped as a first sheet, the other is superposed as a second sheet on the outer peripheral side of the first sheet with a predetermined gap, and a laser beam or the like is radiated at a gentle gradient with respect to a plane that faces the first sheet and the second sheet and such that the intense region of the beam is first applied to an edge portion (distal end surface) of the second sheet. Consequently, it is possible to establish such a temperature gradient in the thickness direction that the temperature is lower on the outer peripheral side for the first sheet, form such a temperature gradient in the thickness direction that the temperature is lower on the inner peripheral side for the second sheet, cause a thermal bending moment in the direction of decreasing the gap between the first sheet and the second sheet, and reduce the burden of adjusting the dynamic balance without using welding metal.

RELATED-ART DOCUMENTS

Patent Documents

[Patent Document 1] Japanese Patent Application Publication No. H2-15891 (JP H2-15891 A)

SUMMARY

In the technique according to Patent Document 1, the dimension of the gap between the first sheet and the second sheet which are superposed on each other is an important element in performing the beam welding, and it is necessary to process the inner peripheral surface of the first sheet and the outer peripheral surface of the second sheet with high precision. However, it is difficult to process the outer peripheral portion of the front cover and the pump shell with a relatively large diameter with high precision. In radiating a high-energy beam such as laser at a large angle to a plane that faces the first and second sheets, in addition, even slight deviation in angle and focal point significantly affects the welding area, which requires managing welding conditions with high precision and requires large-scale equipment and troublesome work.

When the beam is radiated toward an edge portion of the first sheet, further, a corner clearance (recessed groove) that extends over the entire circumference is formed in the outer peripheral surface of the housing, which may lower the rigidity of the fluid coupling housing. Because the first sheet is superposed on the outer peripheral surface of the second sheet, in addition, the outer peripheral surface of the second sheet has been scraped to be thin as compared to the main body. When a molten nugget is formed on the second sheet by the beam, the molten nugget may penetrate the thin second sheet to be dripped into the fluid coupling. In order to prevent such dripping, it is necessary to manage the intensity of the beam with high precision.

It is therefore an object of the present disclosure to provide a manufacturing method for a fluid coupling and a fluid coupling that enable welding with a high-energy beam easily and reliably through relatively simple processing, thereby solving the problem discussed above.

The present disclosure provides a manufacturing method for a fluid coupling in which a turbine runner that opposes a pump blade assembled to a pump shell is housed in a housing constituted by welding a front cover and the pump shell to each other such that respective openings of the front cover and the pump shell oppose each other, the manufacturing method including:

a slimming step of slimming respective outer peripheral surfaces of opening-side end portions of the front cover and the pump shell, which have been shaped by pressing, such that outside diameters of the slimmed outer peripheral surfaces are equal to each other; and a welding step of radiating a high-energy beam toward abutment surfaces from a radially outer side to weld the abutment surfaces to each other, the abutment surfaces being formed when the opening-side end portions of the front cover and the pump shell are caused to abut against each other such that the slimmed outer peripheral surfaces are flush with each other.

The phrase "outside diameters are equal" means that the outside diameters are equal with the inclusion of a difference due to a dimensional tolerance. Thus, the term "flush" also means to be flush with the inclusion of a step due to the dimensional tolerance.

Consequently, the respective outer peripheral surfaces of the opening-side end portions of the front cover and the pump shell, which have been shaped by pressing, are subjected to slimming such as cutting. Slimming can be performed with high precision and relatively easily since slimming is performed on the outer peripheral surfaces of the covers and with an equal outside diameter. The abutment surfaces of the opening-side end portions when the outer peripheral surfaces are made flush with each other are irradiated with a high-energy beam such as laser from the radially outer side to be welded to each other. Thus, welding can be performed easily using relatively simple equipment with the beam focused on the outer peripheral surfaces which have been cut to be made flush with each other. Moreover, for example, the heat input amount can be managed relatively easily by detecting the welding depth through echoing or the like.

The outer peripheral surfaces of the opening-side end portions of the front cover and the pump shell forms a recessed portion which is formed by slimming in the slimming step such that the outside diameters of the outer peripheral surfaces are equal to each other.

Consequently, even in the case where the outer peripheral surfaces of the front cover and the pump shell, which have been shaped by pressing, are not sufficient in precision and not flush with each other with high precision, it is possible to form the abutment surfaces with the recessed portion which has been made flat with high precision through slimming such as cutting because of a step due to the recessed portion, and to perform the welding step with high precision. In addition, the recessed portion is formed such that the outer peripheral surfaces of the opening-side end portions have an equal outside diameter, and therefore the front cover and the pump shell can be shaped by pressing easily. Thus, the pressing step can be shortened, which is advantageous in terms of the manufacturing cost.

An annular reception portion is formed at a radially inner side portion of the opening-side end portion of one of the front cover and the pump shell, the reception portion projecting toward the other of the front cover and the pump shell; and the other of the front cover and the pump shell is superposed on an outer peripheral surface of the reception portion to be fitted therewith, and the abutment surfaces are welded to each other by the high-energy beam with the abutment surfaces received by the reception portion on a radially inner side.

Consequently, the high-energy beam is radiated from the radially outer side of the abutment surfaces with the abutment surfaces received by the reception portion on the radially inner side, and the reception portion extends along the inside wall of the front cover or the pump shell. Therefore, molten metal will not leak into the housing, which makes it possible to keep the quality of the fluid coupling even if management of the high-energy beam is made relatively simple.

The opening-side end portion of the one of the front cover and the pump shell which has the reception portion has an abutment portion that abuts against the opening-side end portion of the other of the front cover and the pump shell and that is provided on a radially outer side of the reception portion;

a corner portion formed between the abutment portion and the reception portion is formed in a round shape;

an angle portion on an inner peripheral side of the opening-side end portion of the other of the front cover and the pump shell has been subjected to round chamfering; and a radius of the round chamfering of the angle portion is larger than a radius of the round shape of the corner portion, and the abutment surfaces are melted by radiation of the high-energy beam to be joined to each other in the welding step.

Consequently, the abutment surfaces can be caused to abut against each other accurately without the round chamfering of the angle portion riding onto the round shape of the corner portion, the round chamfering and the round shape opposing each other. Moreover, the volume of a recess formed between the round chamfering and the round shape which oppose each other is reduced so that only a small amount of molten metal generated by welding, if any, would flow into the recess, which allows welding with high precision.

An outer peripheral surface forming the recessed portion of the one of the front cover and the pump shell, in which the reception portion has been formed, and the outer peripheral surface of the reception portion are formed by slimming in the same slimming step.

Consequently, the outer peripheral surface forming the recessed portion of the one of the front cover and the pump shell and the outer peripheral surface of the reception portion can be formed by processing with high precision.

An outer peripheral surface forming the recessed portion of the other of the front cover and the pump shell and a fitting inner peripheral surface of the other to be fitted with the reception portion are formed by slimming in the same slimming step.

Consequently, the outer peripheral surface forming the recessed portion of the other of the front cover and the pump shell and the fitting inner peripheral surface of the other can be formed by processing with high precision. In combination, when the opening-side end portions are caused to abut against each other in the welding step, the outer peripheral surfaces can be made flush with each other with high precision.

The high-energy beam is radiated along a direction of extension of the abutment surfaces.

The abutment surfaces are formed to be perpendicular to a rotational axis of the fluid coupling, and the high-energy beam is radiated toward the abutment surfaces perpendicularly to the rotational axis of the fluid coupling.

Consequently, the effect of lateral deviation of the beam can be reduced.

The high-energy beam is a laser beam.

This is advantageous in terms of equipment, because laser welding can be performed in the atmosphere while electron beam welding needs to be performed in a vacuum state.

The one of the front cover and the pump shell is the front cover, and the other is the pump shell.

The present disclosure also provides a fluid coupling in which a turbine runner that opposes a pump blade assembled to a pump shell is housed in a housing constituted by welding a front cover and the pump shell to each other such that respective openings of the front cover and the pump shell oppose each other, the fluid coupling including:

a recessed portion formed by recessing respective outer peripheral surfaces of opening-side end portions of the front cover and the pump shell, which have been shaped by pressing, such that outside diameters of the recessed outer peripheral surfaces are equal to each other; and a welded portion formed by performing welding on a surface on which the opening-side end portions abut against each other such that the recessed portion of the front cover and the pump shell is flat.

The outer peripheral surfaces of the front cover and the pump shell are outer peripheral surfaces of cylindrical portions that are parallel to a center axis, and an axial length of the recessed portion is shorter than an axial length of the cylindrical portions and longer than an axial length of the welded portion.

An annular reception portion is formed at a radially inner side portion of the opening-side end portion of one of the front cover and the pump shell, the reception portion projecting toward the other of the front cover and the pump shell; and the other of the front cover and the pump shell is superposed on an outer peripheral surface of the reception portion to be fitted therewith; and the welded portion which is formed by welding abutment surfaces to each other is disposed on a radially outer side of the reception portion, the abutment surfaces being formed when the opening-side end portions of the front cover and the pump shell are caused to abut against each other.

A corner portion formed between the reception portion and the abutment surface of the opening-side end portion of the one of the front cover and the pump shell which has the reception portion is formed in a round shape;

an angle portion on an inner peripheral side of the abutment surface of the opening-side end portion of the other of the front cover and the pump shell has been subjected to round chamfering; and a radius of the round chamfering of the angle portion is larger than a radius of the round shape of the corner portion.

The one of the front cover and the pump shell is the front cover, and the other is the pump shell.

The symbols in the above parentheses are provided for reference to the drawings, and should not be construed as affecting the scope of the claims in any way.

With the manufacturing method for a fluid coupling according to the present disclosure, as discussed above, the abutment surfaces of the front cover and the pump shell can be processed with high precision, and the abutment surfaces can be welded to each other with high precision using relatively simple equipment.

Consequently, the effect of heat due to welding between the front cover and the pump shell is small, welding is performed generally uniformly over the entire circumference, and molten metal such as a welding wire is not input. Thus, it is possible to relatively easily manufacture a fluid coupling with high precision in which the housing is not warped significantly and the dynamic balance is not affected significantly. In addition, post-processing such as dynamic balance adjustment and coupling with the engine output shaft is simplified.

The fluid coupling according to the present disclosure is manufactured relatively easily and with high precision, and it is possible to obtain a fluid coupling such as a torque converter with a good appearance and high precision that has high performance such as dynamic balance. Even in the case where the outer peripheral surfaces of the front cover and the pump shell, which have been shaped by pressing, are not flush with each other with high precision, the abutment surfaces which are flush with each other with high precision can be formed because of a step due to the recessed portion with an equal outside diameter, which makes it possible to obtain a fluid coupling with a high-quality appearance and high-quality performance.

DETAILED DESCRIPTION OF THE PREFERRED EMBODIMENT

Figure 1:
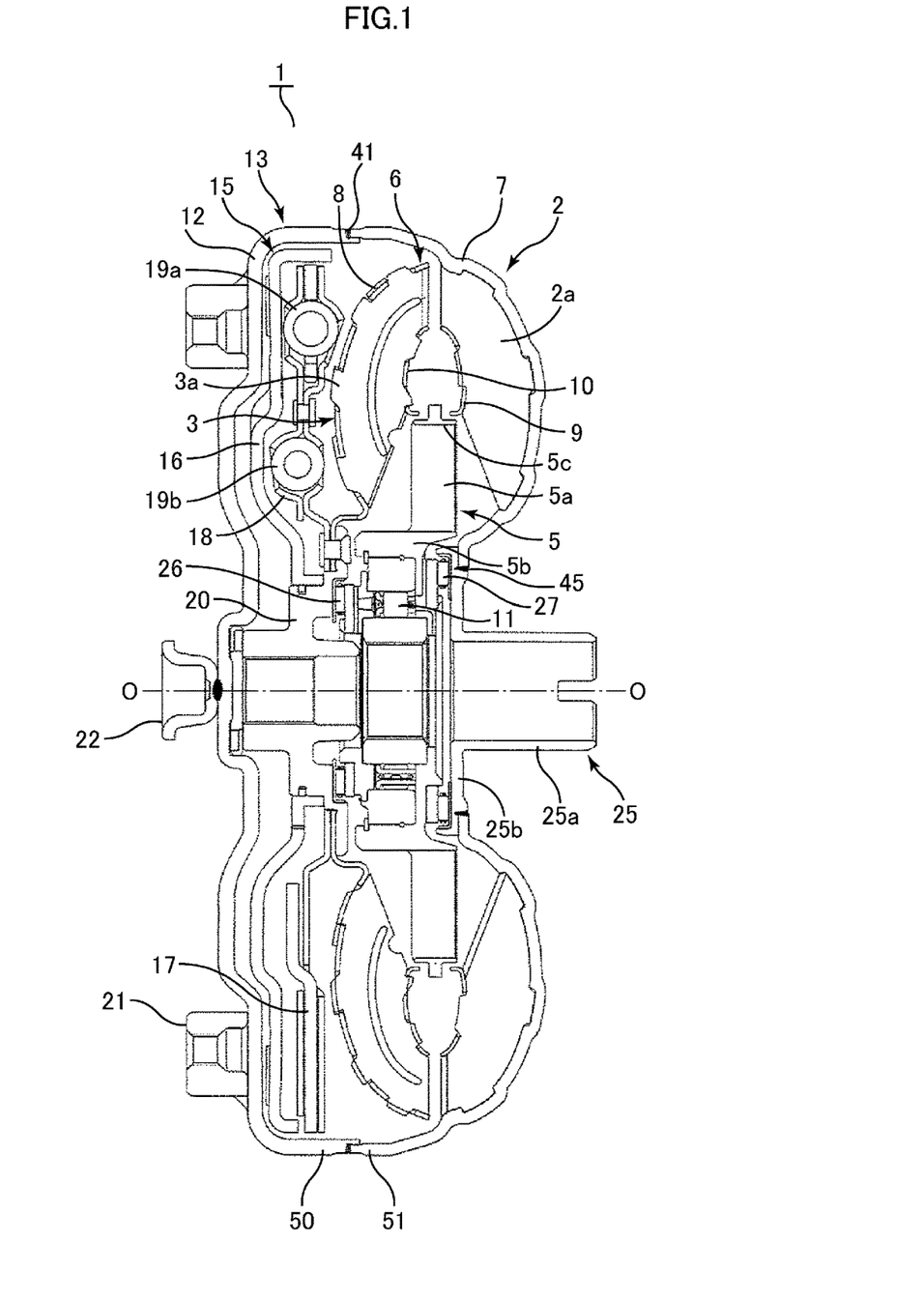
FIG. 1 is a sectional view illustrating a torque converter according to an embodiment of the present disclosure.

An embodiment of the present disclosure will be described below with reference to the drawings. As illustrated in FIG. 1, a torque converter 1 which is a fluid coupling has a pump impeller 2, a turbine runner 3, and a stator 5, which constitute a torus 6. The pump impeller 2 has a large number of pump blades 2a. The outer side of the pump blades 2a is integrally assembled to a pump shell 7 that constitutes a part (outer shell) of the torus 6. The inner side of the blades 2a is integrally fixed to an inner shell 9. The turbine runner 3 has a large number of turbine blades 3a disposed so as to oppose the pump blades 2a. The outer side of the blades 3a is fixed to a turbine outer shell 8 that constitutes a part of the torus 6. The inner side of the blades 3a is fixed to an inner shell 10.

The stator 5 is composed of a boss portion 5b, an annular drum portion 5c, and a large number of blades 5a fixed between the boss portion 5b and the drum portion 5c. A one-way clutch 11 is disposed on the radially inner side of the boss portion 5b. An outer race of the one-way clutch 11 is fixed to the boss portion 5b. An inner race of the one-way clutch 11 is fixed to a stationary member such as the pump shell via a sleeve.

The pump shell 7 is integrally fixed to a front cover 12 on the front side (engine side) with their openings opposing each other and by welding over the entire circumference. The pump shell 17 and the front cover 12 which are integral with each other constitute a housing 13. The housing 13 houses a lock-up clutch 15 in addition to the pump impeller 2, the turbine runner 3, and the stator 5. The lock-up clutch 15 has: a clutch plate 16 that may be brought into and out of contact with a side surface of the front cover 12, an intermediate plate 17 that rotates together with the clutch plate 16, an output plate 18, and damper springs 19a and 19b in two stages interposed between the intermediate plate 17 and the output plate 18. The output plate 18 is integrally fixed to a turbine boss 20 together with the radially inner portion of the turbine outer shell 8.

A pump boss 25 that constitutes a part of the housing 13 is fixed to the radially inner side of the pump shell 7. The pump boss 25 has a cylindrical portion 25a and a flange portion 25b that extends vertically from one end of the cylindrical portion. The outer peripheral surface of the flange portion 25b is integrally fixed to the circumferential surface of the radially inner portion of the pump shell 7 by welding. The pump impeller 2, the turbine runner 3, the stator 5, the one-way clutch 11, and the lock-up clutch 15 are housed in the housing 13 with the one-way clutch 11 positioned between the pump boss 25 and the turbine boss 20 via thrust bearings 26 and 27 and with the turbine boss 20 and the one-way clutch 11 positioned between the pump shell 7 and the front cover 12.

The clutch plate 16 is rotatably supported on the outer peripheral side of the turbine boss 20. An input shaft of an automatic speed change device (not illustrated) or the like may be engaged with splines on the inner peripheral side of the turbine boss 20. A set block 21 and a center block 22 are integrally fixed on the radially outer side and at the center portion, respectively, of the outside surface, on the front side, of the front cover 12 by welding. The torque converter 1 is centered on an engine output shaft by the center block 22, and bolted to the set block 21 via a drive plate to be attached to the engine output shaft.

In the torque converter 1 which is configured as described above, rotation of the engine output shaft is transferred to the housing 13, which is composed of the front cover 12, the pump shell 7, and the pump boss 25 which are integral with each other, and the pump impeller 2 rotates together with the housing 13. Rotation of the pump impeller 2 causes a fluid in the torus 6 to flow toward the turbine runner 3 because of a centrifugal force, and to be further circulated back to the pump impeller 2 through the turbine runner 3 and the stator 5. In this event, in the state in which the difference in rotational speed between the turbine runner 3 and the pump impeller 2 is large, the blades 5a of the stator 5 change the direction of the flow of the fluid to a direction that assists rotation of the pump impeller 2, which increases torque (converter range). When the flow of the fluid from the turbine runner 3 becomes so rapid that a reference speed ratio is exceeded and the fluid which has flowed onto the front surface of the stator 5 flows onto the back surface of the stator 5, the stator 5 idles because of the one-way clutch 11 (clutch point), and thereafter acts as a fluid coupling (coupling range). Rotation of the turbine runner 3 is transferred to the input shaft of the speed change device (not illustrated) via the turbine boss 20.

By changing the supply direction of oil to be circulated and supplied into the housing 13, the lock-up clutch 15 is switched to the connection position. In this state, the clutch plate 16 contacts a side surface of the front cover 12, and rotation of the housing 13 is directly transferred to the clutch plate 16, and further transferred to the output plate 18 via the intermediate plate 17 and the damper springs 19a and 19b to be transferred to the turbine boss 20. The lock-up clutch 15 is not limited to the configuration according to the embodiment. The lock-up clutch 15 may be provided with a hydraulic servo that operates the clutch plate, may be constituted of a multi-plate clutch, or may be configured otherwise. The lock-up clutch 15 may allow slip control, or may not be provided.

Figure 2:
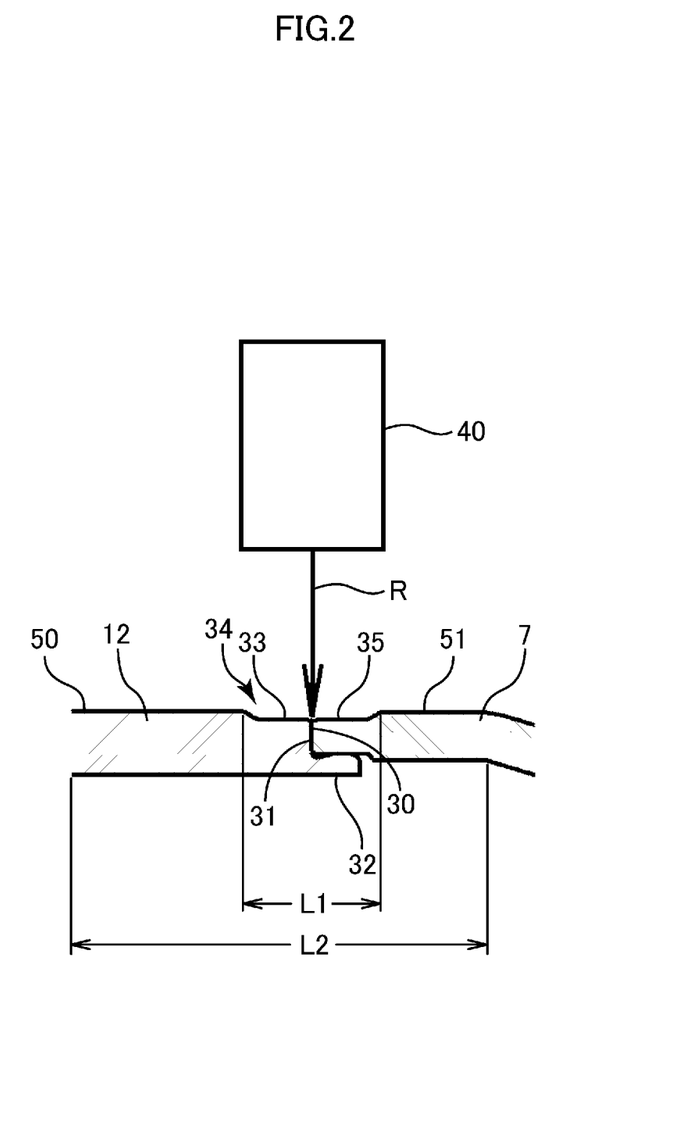
FIG. 2 is a sectional view illustrating welding between a front cover and a pump shell.
Figure 3:
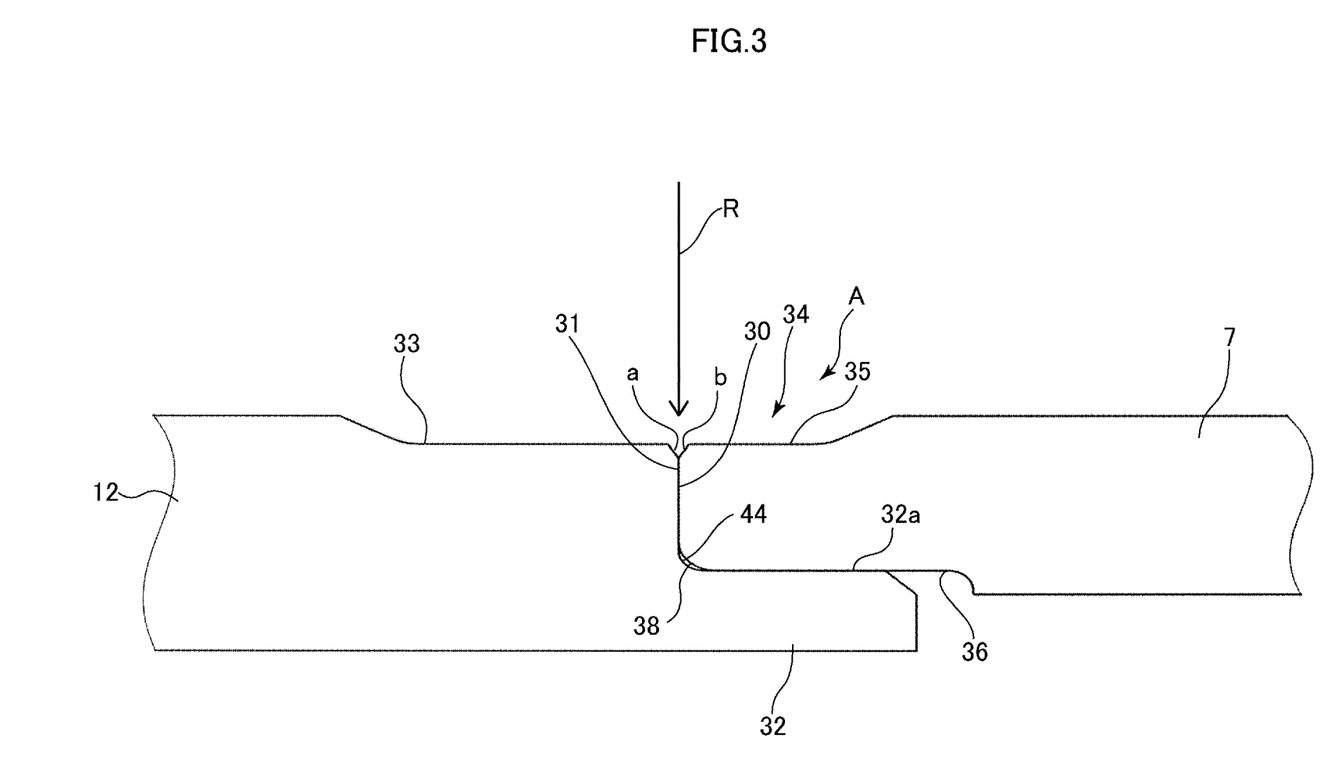
FIG. 3 is an enlarged view of a welded portion.
Figure 4A:
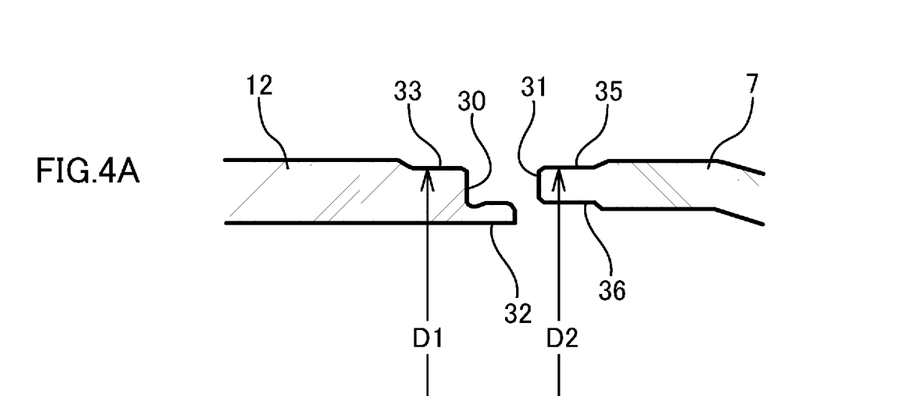
FIG. 4A is a sectional view illustrating the front cover and the pump shell in the state before being welded.
Figure 4B:
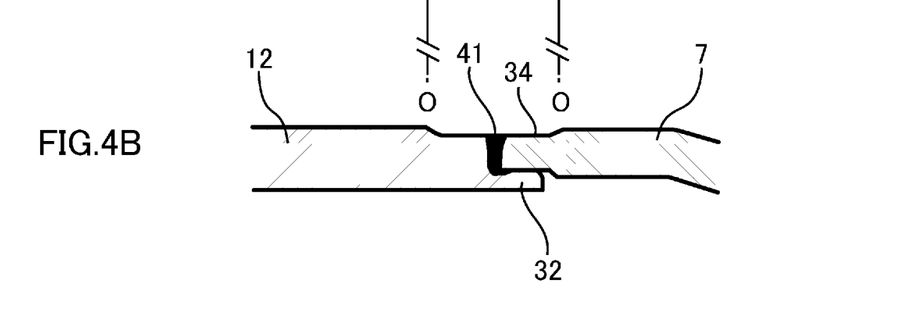
FIG. 4B is a sectional view illustrating the front cover and the pump shell in the welded state.

Next, a manufacturing method for the torque converter 1, in particular the housing 13 thereof, will be described. The front cover 12 and the pump shell 7 are shaped by pressing (pressing step). In this event, as illustrated in FIGS. 2, 3, and 4, an opening-side end portion 30 of the front cover 12 and an opening-side end portion 31 of the pump shell 7 are formed on cylindrical portions 50 and 51, respectively, which have an outer peripheral surface which is a plane that is orthogonal to an axis (rotational axis) O-O (see FIG. 1) of the torque converter 1. The end portions (end surfaces) 30 and 31 constitute abutment surfaces that are caused to abut against each other. One of the two end portions, which is the end portion on the front cover 12 side in the embodiment, is thicker than the other (pump shell 7). A radially inner side portion of the end portion 30 projects toward the other to constitute an annular reception portion (positioning portion) 32. In general, the front cover 12 is thicker than the pump shell 7 in consideration of the rigidity and the strength. Providing the front cover 12 with the reception portion 32 is advantageous in securing the welding length and the thickness of the reception portion.

The abutment surface 30 of the opening-side end portion of the front cover 12 constitutes an abutment portion that abuts against the abutment surface 31 of the opening-side end portion of the pump shell 7. A corner portion at which the abutment portion 31 which is the abutment surface and an outer peripheral surface 32a of the reception portion 32 intersect each other has a round shape (round corner) 44 with a predetermined radius. In addition, an angle portion at which the abutment surface 31 of the opening-side end portion of the pump shell 7 and an inner peripheral surface 36 to be fitted with the reception portion 32 intersect each other has been chamfered (round angle) 38 with a predetermined radius. The radius of the round angle 38 is smaller than the radius of the round corner 44 by a predetermined amount. The difference in radius between the round corner 44 and the round angle 38 is preferably equal to or less than 0.4 [mm]. The round angle 38 and the round corner 44 oppose each with the abutment surfaces 30 and 31 abutting against each other. Since the round angle 38 is smaller in radius than the round corner 44, the round angle 38 and the round corner 44 do not interfere with each other. Moreover, since the difference in radius is the small value mentioned above, a recess formed between the round angle 38 and the round corner 48 which oppose each other has a small volume. Consequently, the round angle 38 will not be placed on the round corner 44 when the abutment surfaces 30 and 31 are caused to abut against each other, which allows the abutment surfaces to abut against each other with high precision. When welding is performed by radiating a high-energy beam R such as a laser beam to be discussed later, in addition, no molten metal, or only a small amount thereof if any, flows into the recessed portion formed by the round angle 38 and the round corner 44, which allows welding with high precision in combination with the abutment between the abutment surfaces 30 and 31 with high precision.

As illustrated in FIG. 4A, an outer peripheral surface 33 that borders the opening-side end portion 30 of the front cover 12 and an outer peripheral surface 35 that borders the opening-side end portion 31 of the pump shell 7 are formed by slimming (slimming step), such as cutting, grinding, or polishing, such that outside diameters D1 and D2 are equal to each other (D1=D2). The slimmed outer peripheral surfaces 33 and 35 constitute a flat surface that is parallel to the axial direction O-O. FIG. 3 illustrates a portion A that is formed by slimming, such as cutting, as a result of the slimming step. The outer peripheral surfaces 33 and 35 forms a recessed portion 34 which is formed as a result of slimming, e.g., cutting or polishing, the outer peripheral surfaces of the front cover 12 and the pump shell 7. The equal outside diameters include a tolerance. In this event, the front cover 12 side and the pump shell 7 side may be slimmed separately. That is, the outer peripheral surface 33 forming the recessed portion 34 and the outer peripheral surface 32a of the reception portion 32 of the front cover 12 are processed in the same slimming (cutting, grinding, or polishing) step, and the outer peripheral surface 35 forming the recessed portion 34 and the fitting inner peripheral surface 36 of the pump shell 7 are processed in the same slimming (cutting, grinding, or polishing) step. Alternatively, with the units housed in the housing 13, the front cover 12 and the pump shell 7 may be fixed using a jig with the end portion 31 of the pump shell 7 placed on the reception portion 32 of the front cover 12 to be positioned, that is, with the end portions 30 and 31 abutting against each other, and the outer peripheral surfaces 33 and 35 may be slimmed successively in this state. Furthermore, as illustrated in FIG. 3, corner portions of the outer peripheral surfaces 33 and 35 adjacent the end portions 30 and 31 may be chamfered to form small chamfered portions a and b. In the case where processing is performed with the units fixed in the abutting state, the fitting inner peripheral surface 36 which adjoins the end portion 31 on the pump shell 7 side is preferably slimmed into a cylindrical shape before the outer peripheral surfaces 33 and 35 are processed.

Next, as illustrated in FIGS. 2 and 3, the fitting inner peripheral surface 36 of the pump shell 7 is superposed on the reception portion 32 to be fitted therewith, and the end portion 30 which is the abutment surface of the front cover 12 and the end portion 31 which is the abutment surface of the pump shell 7 are caused to abut against each other. With the abutment surfaces 30 and 31 positioned so as to abut against each other, the outer peripheral surfaces 33 and 35 which are flat surfaces of the same diameter (D1=D2) are flush with each other. The state of being flush includes a state with a slight step due to a tolerance etc. In this state, the front cover 12 and the pump shell 7 are temporarily fixed to each other by a jig or the like, and the laser beam R is radiated from a laser head 40 installed on the radially outer side toward the abutment surfaces 33 and 35 and along the abutment surfaces. Specifically, the laser beam R is radiated toward the small chamfered portions a and b perpendicularly to the axis (rotational axis) O-O of the housing 13 which has been temporarily fastened and toward the abutment surfaces which are perpendicular to the axis, and the housing 13 is rotated about the axis (rotational axis) O-O.

Consequently, as illustrated in FIG. 4B, welding is performed in the vicinity of the abutment surfaces 30 and 31 of the front cover 12 and the pump shell 7 over the entire circumference, with the base material melted by high energy from the laser beam and without using a welding rod unlike arc welding. In this event, the laser beam R can be easily focused on the outer peripheral surfaces 33 and 35 which are flush with each other, and welding can be performed while relatively easily managing the heat input amount by detecting the welding depth through echo exploration. In addition, a welded portion 41 is supported by the reception portion 32 on the radially inner side, and the molten metal generated by radiation of the laser beam R from the radially outer side will not leak into the housing 13 in which the units are housed, which makes it relatively easy to manage laser welding. In addition, occurrence of detective products due to leakage of the molten metal into the housing 13 can be suppressed. In addition, as discussed above, the abutment surfaces 30 and 31 of the front cover 12 and the pump shell 7 abut against each other with high precision, and the volume of a recess formed between the round angle 38 and the round corner 44 which oppose each other is so small that only a small amount of molten metal, if any, would flow into the recess. This may significantly affect the welding precision of welding in which a high-energy beam such as a laser beam is used, in which molten metal is not applied to the welded portion unlike arc welding.

Thus, with the abutment surfaces welded by the laser, the welded portion 41 is locally provided in the vicinity of the abutment surfaces, a relatively small heat input amount is sufficient, and a narrow range is affected by heat. With no need to input molten metal such as a welding wire, moreover, welding can be performed with high precision generally uniformly over the entire circumference of the housing. Consequently, the torque converter 1 manufactured by the manufacturing method has high precision with little welding warp, and can be easily subjected to post-processing such as dynamic balance adjustment and coupling with the engine output shaft. This makes it possible to reduce the total manufacturing cost and obtain a high-quality torque converter.

In the torque converter 1, the recessed portion 34 is formed in the cylindrical portions 50 and 51 of the front cover 12 and the pump shell 7 in the slimming step. Thus, as illustrated in FIG. 2, an axial length L1 of the recessed portion 34 is shorter than a length L2 of the cylindrical portions 50 and 51, and longer than the axial length of the welded portion 41. Even in the case where the front cover 12 and the pump shell 7, which have been shaped by pressing, are not sufficient in precision and the outer peripheral surfaces of the cylindrical portions 50 and 51 are not flush with each other with high precision, the precision of the outer peripheral surfaces 33 and 35 forming the recessed portion 34, which adjoin the abutment surfaces 30 and 31, can be kept high by the step of the recessed portion 34 which has been formed by slimming. This makes it possible to perform welding with a high-energy beam such as a laser beam in focus and manage the heat input amount precisely and easily. Moreover, it is possible to obtain the torque converter 1 as a product that has no step in the welding abutment portion and provides a high-quality appearance and high-quality performance such as the dynamic balance. In addition, welding in which a high-energy beam such as the laser beam is used does not require input of molten metal, and high-precision abutment between the abutment surfaces 30 and 31 and a restricted flow of molten metal into the recessed portion formed by the round angle 38 and the round corner 44 reduces a recess in the outer peripheral surface of the welded portion 41 to improve the quality in appearance of the welded portion 41.

Figure 5:
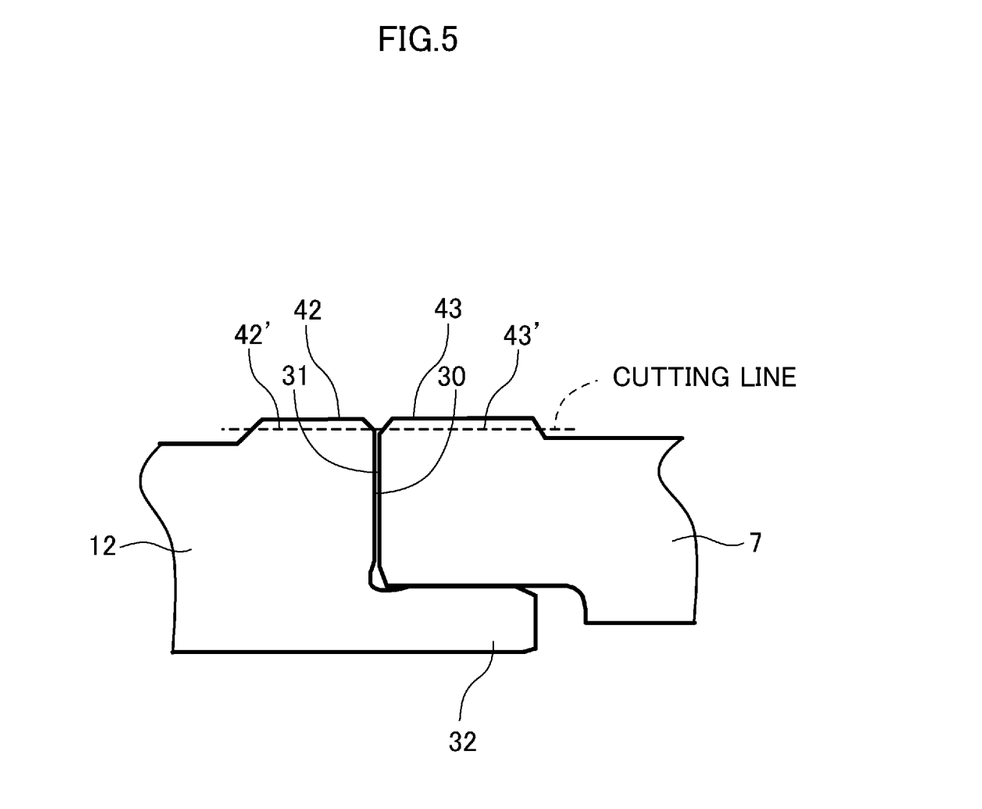
FIG. 5 is an enlarged view illustrating a welded portion between a front cover and a pump shell according to a partially modified embodiment.

FIG. 5 illustrates a partially modified embodiment. In the embodiment, outer peripheral surfaces 42 and 43 that adjoin the opening-side end portions 30 and 31 on the front cover 12 side and the pump shell 7 side are shaped so as to be swollen in the pressing step. The outer peripheral surfaces 42 and 43 which are swollen are processed in the cutting step so as to have an equal outside diameter. (The cutting line is indicated in FIG. 5.) As in the preceding embodiment, a laser beam is radiated toward the abutment surfaces 30 and 31 to weld outer peripheral surfaces 42' and 43' which are flush with each other.

Laser welding is also performed at a connection portion 45 (see FIG. 1) between the pump shell 7 and the pump boss 25.

In the embodiment, welding is performed using laser. However, welding may be performed using other high-energy beams such as an electron beam. In addition, the present disclosure is applied to a torque converter that has a stator. However, the present disclosure may be equally applied to a fluid coupling in the narrow sense that does not have a stator.

INDUSTRIAL APPLICABILITY

The present disclosure is utilized in, for example, the automotive industry for a fluid coupling such as a torque converter for use in an automatic transmission of an automobile.

DESCRIPTION OF THE REFERENCE NUMERALS

1 FLUID COUPLING (TORQUE CONVERTER)
2 PUMP IMPELLER
2a PUMP BLADE
3 TURBINE RUNNER
5 STATOR
7 PUMP SHELL
12 FRONT COVER
13 HOUSING 30, 31 OPENING-SIDE END PORTION, ABUTMENT SURFACE
32 RECEPTION PORTION
33, 35 OUTER PERIPHERAL SURFACE (FLAT SURFACE)
34 RECESSED PORTION
36 FITTING INNER PERIPHERAL SURFACE
38 ROUND CHAMFERING (ROUND ANGLE)
41 WELDED PORTION
44 ROUND SHAPE (ROUND CORNER)
50, 51 CYLINDRICAL PORTION

The invention claimed is:

1. A manufacturing method for a fluid coupling in which a turbine runner that opposes a pump blade assembled to a pump shell is housed in a housing constituted by welding a front cover and the pump shell to each other such that respective openings of the front cover and the pump shell oppose each other, the manufacturing method comprising:
   a slimming step of slimming respective outer peripheral surfaces of opening-side end portions of the front cover and the pump shell, which have been shaped by pressing, such that outside diameters of the slimmed outer peripheral surfaces are equal to each other; and
   a welding step of radiating a high-energy beam toward abutment surfaces from a radially outer side to weld the abutment surfaces to each other, the abutment surfaces being formed when the opening-side end portions of the front cover and the pump shell are caused to abut against each other such that the slimmed outer peripheral surfaces are flush with each other.

2. The manufacturing method for a fluid coupling according to claim 1, wherein
   the outer peripheral surfaces of the opening-side end portions of the front cover and the pump shell form a recessed portion which is formed by slimming in the slimming step such that the outside diameters of the outer peripheral surfaces are equal to each other.

3. The manufacturing method for a fluid coupling according to claim 2, wherein:
   an annular reception portion is formed at a radially inner side portion of the opening-side end portion of one of the front cover and the pump shell such that the reception portion projects toward the other of the front cover and the pump shell; and
   the other of the front cover and the pump shell is superposed on an outer peripheral surface of the reception portion to be fitted therewith, and the abutment surfaces are welded to each other by the high-energy beam with the abutment surfaces received by the reception portion on a radially inner side.

4. The manufacturing method for a fluid coupling according to claim 3, wherein:
   the opening-side end portion of the one of the front cover and the pump shell which has the reception portion has an abutment portion that abuts against the opening-side end portion of the other of the front cover and the pump shell and that is provided on a radially outer side of the reception portion;
   a corner portion formed between the abutment portion and the reception portion is formed in a round shape;
   an angle portion on an inner peripheral side of the opening-side end portion of the other of the front cover and the pump shell has been subjected to round chamfering; and
   a radius of the round chamfering of the angle portion is larger than a radius of the round shape of the corner portion, and the abutment surfaces are melted by radiation of the high-energy beam to be joined to each other.

5. The manufacturing method for a fluid coupling according to claim 3, wherein an outer peripheral surface forming the recessed portion of the one of the front cover and the pump shell, in which the reception portion has been formed, and the outer peripheral surface of the reception portion are formed by slimming in the same slimming step.

6. The manufacturing method for a fluid coupling according to claim 3, wherein an outer peripheral surface forming the recessed portion of the other of the front cover and the pump shell and a fitting inner peripheral surface of the other to be fitted with the reception portion are formed by slimming in the same slimming step.

7. The manufacturing method for a fluid coupling according to claim 1, wherein the high-energy beam is radiated along a direction of extension of the abutment surfaces.

8. The manufacturing method for a fluid coupling according to claim 6, wherein the abutment surfaces are formed to be perpendicular to a rotational axis of the fluid coupling, and the high-energy beam is radiated toward the abutment surfaces perpendicularly to the rotational axis of the fluid coupling.

9. The manufacturing method for a fluid coupling according to claim 1, wherein the high-energy beam is a laser beam.

10. The manufacturing method for a fluid coupling according to claim 1, wherein the one of the front cover and the pump shell is the front cover, and the other is the pump shell.

11. The manufacturing method for a fluid coupling according to claim 4, wherein an outer peripheral surface forming the recessed portion of the one of the front cover and the pump shell, in which the reception portion has been formed, and the outer peripheral surface of the reception portion are formed by slimming in the same slimming step.

12. The manufacturing method for a fluid coupling according to claim 4, wherein an outer peripheral surface forming the recessed portion of the other of the front cover and the pump shell and a fitting inner peripheral surface of the other to be fitted with the reception portion are formed by slimming in the same slimming step.

13. The manufacturing method for a fluid coupling according to claim 5, wherein the high-energy beam is radiated along a direction of extension of the abutment surfaces.

14. The manufacturing method for a fluid coupling according to claim 8, wherein the high-energy beam is a laser beam.

15. The manufacturing method for a fluid coupling according to claim 14, wherein the one of the front cover and the pump shell is the front cover, and the other is the pump shell.

16. A fluid coupling in which a turbine runner that opposes a pump blade assembled to a pump shell is housed in a housing constituted by welding a front cover and the pump shell to each other such that respective openings of the front cover and the pump shell oppose each other, the fluid coupling comprising:
   a recessed portion formed by recessing respective outer peripheral surfaces of opening-side end portions of the front cover and the pump shell, which have been shaped by pressing, such that outside diameters of the recessed outer peripheral surfaces are equal to each other; and
   a welded portion formed by performing welding on surfaces on which the opening-side end portions abut against each other such that the recessed portion of the front cover and the pump shell is flat.

17. The fluid coupling according to claim 16, wherein the outer peripheral surfaces of the front cover and the pump shell are outer peripheral surfaces of cylindrical portions that are parallel to a center axis, and an axial length of the recessed portion is shorter than an axial length of the cylindrical portions and longer than an axial length of the welded portion.

18. The fluid coupling according to claim 16, wherein:
an annular reception portion is formed at a radially inner side portion of the opening-side end portion of one of the front cover and the pump shell, the reception portion projecting toward the other of the front cover and the pump shell; and
the other of the front cover and the pump shell is superposed on an outer peripheral surface of the reception portion to be fitted therewith; and
the welded portion which is formed by welding abutment surfaces to each other is disposed on a radially outer side of the reception portion, the abutment surfaces being formed when the opening-side end portions of the front cover and the pump shell are caused to abut against each other.

19. The fluid coupling according to claim 18, wherein:
a corner portion formed between the reception portion and the abutment surface of the opening-side end portion of the one of the front cover and the pump shell which has the reception portion is formed in a round shape;
an angle portion on an inner peripheral side of the abutment surface of the opening-side end portion of the other of the front cover and the pump shell has been subjected to round chamfering; and
a radius of the round chamfering of the angle portion is larger than a radius of the round shape of the corner portion.

20. The fluid coupling according to claim 16, wherein the one of the front cover and the pump shell is the front cover, and the other is the pump shell.

* * * * *